United States Patent
Reinhard et al.

(10) Patent No.: US 7,102,899 B2
(45) Date of Patent: Sep. 5, 2006

(54) CONTROL CIRCUIT FOR SWITCHED MODE POWER SUPPLY UNIT

(75) Inventors: Arno Reinhard, Munster (DE); Armin Wegener, Beckum (DE); Rudiger Malsch, Bad Schandau (DE); Ralf Gennant Berghegger Schroder, Glandorf (DE)

(73) Assignee: FRIWO Mobile Power GmbH, Ostbevern (DE)

( * ) Notice: Subject to any disclaimer, the term of this patent is extended or adjusted under 35 U.S.C. 154(b) by 0 days.

(21) Appl. No.: 11/057,029

(22) Filed: Feb. 11, 2005

(65) Prior Publication Data

US 2005/0254268 A1 Nov. 17, 2005

(51) Int. Cl.
H02M 3/335 (2006.01)
H02M 1/12 (2006.01)

(52) U.S. Cl. .................... 363/21.01; 363/21.11; 363/41; 363/49

(58) Field of Classification Search .................. 363/16, 363/18, 19, 21.01, 21.07, 21.08, 21.11, 21.15, 363/21.16, 21.18, 41, 49
See application file for complete search history.

(56) References Cited

U.S. PATENT DOCUMENTS

| | | | |
|---|---|---|---|
| 4,510,563 A | 4/1985 | Sato | |
| 5,438,499 A | 8/1995 | Bonte et al. | |
| 5,459,652 A | 10/1995 | Faulk | |
| 5,874,841 A | 2/1999 | Majid et al. | |
| 5,956,242 A * | 9/1999 | Majid et al. | 363/21.16 |

FOREIGN PATENT DOCUMENTS

| | | |
|---|---|---|
| EP | 1146630 | 10/2001 |
| EP | 1211794 | 6/2002 |
| JP | 04033566 | 2/1992 |
| JP | 08103075 | 4/1996 |

OTHER PUBLICATIONS

PCT Notification of Transmittal of Copies of Translation of the International Preliminary Report on Patentability, mailed Mar. 2, 2006.

* cited by examiner

Primary Examiner—Jessica Han
(74) Attorney, Agent, or Firm—Michael Best & Friedrich LLP

(57) ABSTRACT

The present invention relates to a control circuit for controlling the output power of a primary-controlled switched mode power supply unit, which comprises a primary switch and a transformer with an auxiliary winding. Within the auxiliary winding, voltage pulses are induced by primary-sided switching operations, which can be taken into account when controlling the output power. In order to provide an improved control and an enhanced flexibility with respect to the operational parameters, the sampling instance is determined based on the duration of the voltage pulse at the auxiliary winding during a previous switching cycle. In order to detect a defective contact between the auxiliary winding and the control circuit in a particularly simple and secure manner, the negative voltage pulse at the auxiliary winding occurring when the switch is closed may be used for confirming a proper connection. In order to optimize the switching off process of the switch and to reduce power losses, the output power may be controlled by comparing the current through the primary winding with two threshold values.

30 Claims, 4 Drawing Sheets

CONTROL CIRCUIT FOR SWITCHED MODE POWER SUPPLY UNIT

BACKGROUND

The present invention relates to a control circuit for controlling the output power of a primary-controlled switched mode power supply unit. In particular, the present invention relates to a control circuit in a primary-control switched mode power supply unit, which comprises a primary switch and a transformer with an auxiliary winding. Within the auxiliary winding, voltage pulses are induced by primary-sided switching operations, which can be taken into account when controlling the output power. Further, the invention relates to a method for operating a switched mode power supply unit of this kind. Moreover, the present invention relates to a method for controlling the output of a primary-controlled switched mode power supply unit with a transformer and a primary-sided switch, wherein the primary-sided switch can be controlled by a driver.

Switched mode power supply units are used in numerous electronic devices, in order to generate out of a mains voltage a low DC voltage which is necessary for supplying the electronic components. In many application fields switched mode power supply units are preferred to conventional power supply units with mains transformers because they have better efficiency starting from a particular performance category and have in particular a lower space requirement. The latter is in particular due to the fact that instead of the mains voltage a high-frequency alternating voltage is transformed, which can have instead of the conventional mains frequency of 50 Hz or 60 Hz for instance a frequency in a range from 20 kHz up to 200 kHz. Because the necessary number of turns of the transformer decreases inverse proportionally to the frequency, the copper losses may be reduced strongly and the transformer required will be significantly smaller.

In order to further optimize the efficiency, in particular primary switched power supply units are known, wherein the frequency which is generated on the primary-side of the high frequency transformer by means of switch, for instance a bipolar transistor, is controlled dependent on the load which is present on the secondary side of the power supply unit in order to avoid a saturation of the high frequency transformer. The feedback which is necessary for such a control scheme can be realized for instance by using a voltage tapped at an auxiliary winding as controlled variable. This is for instance shown in the European patent application EP 1 146 630 A2. The method for controlling the output current and/or the output voltage of a switched power supply as shown in document EP 1 146 630 A2, implies that with each pulse the same energy is loaded into the transformer. Each time after a fixed time with respect to the opening of the switch, the voltage at the auxiliary winding is sampled and stored by means of a sample and hold element (S & H element). The disadvantage of this method, however, is that the sample timing is of great significance for the performance of the controlling and that the form of the voltage pulses at the auxiliary winding is strongly influenced by the different operation parameters, such as input voltages, disturbances etc. That means that a fixed value for the instant of sampling limits the flexibility and range of application for such a switched mode power supply unit strongly.

SUMMARY

The object underlying the present invention is to provide a control circuit for controlling the output power of a primary-controlled switched mode power supply circuit and a corresponding method for controlling a switched mode power supply, wherein an improved control and an enhanced flexibility with respect to the operational parameters may be achieved.

According to an advantageous embodiment, a control circuit for controlling the output power of a primary-control switched mode power supply unit, said switched mode power supply unit comprising a primary-side switch and a transformer with an auxiliary winding, wherein after the opening of the primary-side switch a voltage pulse is induced, may comprise a circuit arrangement for generating a sampling signal which defines a sampling instance with respect to the instance of the opening of the primary-side switch. Said control circuit further comprises a sample and hold device for sampling and storing a height of the voltage pulse in response to the sampling signal for generating a controlled variable, and a control unit for comparing the controlled variable with a reference value and for adjusting the output power dependent on the result of this comparison. The circuit arrangement is adapted to determine the sampling instance based on the duration of said voltage pulse.

A circuit arrangement for generating a sampling signal that determines the instance of sampling a controlled variable for controlling the output power of a primary-controlled switched mode power supply unit, wherein said switched mode power supply unit comprises a primary-side switch and a transformer with an auxiliary winding, wherein after the opening of the primary-side switch a voltage pulse is induced, comprises the following elements: a constant current source, a first capacitor to be charged by means of the constant current source, a second capacitor to be connected in parallel to the first capacitor, a comparator which is connected to one terminal of each of the two capacitors and is operable to output the sampling signal, if the voltages at the two capacitors are equal.

A method for controlling the output power of a primary-controlled switched mode power supply may comprise the following steps: during one switching cycle, sampling and storing a height of the voltage pulse in response to a sampling signal which defines a sampling instance after the opening of the switch for generating a controlled variable, comparing the controlled variable with a reference value and adjusting the output power dependent on the result of said comparison, wherein the sampling instance is determined based on the duration of the voltage pulse at the auxiliary winding during a previous switching cycle.

Further, with such a switched mode power supply it has to be guaranteed, that in case of a defective connecting of the auxiliary winding or in case of a wire fracture the output voltage of the switched mode power supply is limited to a secure level by means of appropriate measures. Normally, this is achieved by means of a further control circuit, an over-voltage monitoring device or similar measures. These known methods have the disadvantage, that normally additional electronic components are necessary which render the circuitry unnecessarily complex and costly.

Thus a further object of the present invention is to provide an improved method for recognizing such a fault.

According to a further advantageous embodiment, a method for controlling the output power of a primary-controlled switched mode power supply unit with a transformer and a primary-side switch, wherein the transformer comprises an auxiliary winding, wherein after the opening of the primary-side switch a first voltage pulse and after the closing of the primary-side switch a second voltage pulse is induced, comprises the following steps: during one switching cycle, sampling and storing a height of the first voltage pulse for generating a controlled variable, comparing the controlled variable with a reference value and adjusting the output power dependent on the result of said comparison, sampling a height of the second voltage pulse and comparing same with a threshold value and setting a secure operating modus of the switched mode power supply unit, in case that the comparison indicates a transgression of said threshold value.

Finally, with integrated drivers for bipolar, field effect or IGBT transistors, which are used as primary-side switches in such switched mode power supplies, the problem occurs that during the switching a high cross current is flowing through the driving transistors. This current affects the power supply of the circuitry and causes unnecessary power loss. Further, this current can cause disturbances, which for instance may deteriorate the performance of the integrated circuitry. Normally, this is remedied by means of a delay circuit that ensures that always first one driving transistor is switched off before the other driving transistor is switched on. However, when being used within a switched mode power supply, this solution has the disadvantage that during the delay time before switching off the primary-side switch, the current within the transformer further augments. Due to the dependence of the augmenting velocity on the input voltage, the delay causes a peak current which is also dependent on the input voltage. If the peak current, for instance with a device according to EP 1 146 630 A2, is used for adjusting the output current of the device, this has the disadvantage of causing an output current being dependent on the input voltage.

Thus, a further object of the present invention can be seen in providing an improved method for controlling the output power of a primary-side controlled switched mode power supply and a driver circuit for a primary-side switch in such a switched mode power supply unit, wherein the process or switching off the primary-side switch may be improved and wherein the power dissipation of the switched mode power supply unit may be reduced.

According to still another advantageous embodiment, a method for controlling the output power of a primary-controlled switched mode power supply unit with a transformer and a primary-side switch, wherein said primary-side switch is controllable by means of a driver, may comprise the following steps: detecting the current which is flowing through a primary winding of the transformer, comparing the detected current with a first threshold value and with a second threshold value, switching the driver into a high impedance state, when the detected current transgresses the first threshold value, opening the primary-side switch, when the detected current transgresses the second threshold value.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The illustrated embodiments of the present invention will be described with reference to the figure drawings wherein like elements and structures are indicated by like reference numbers.

Figure 1:
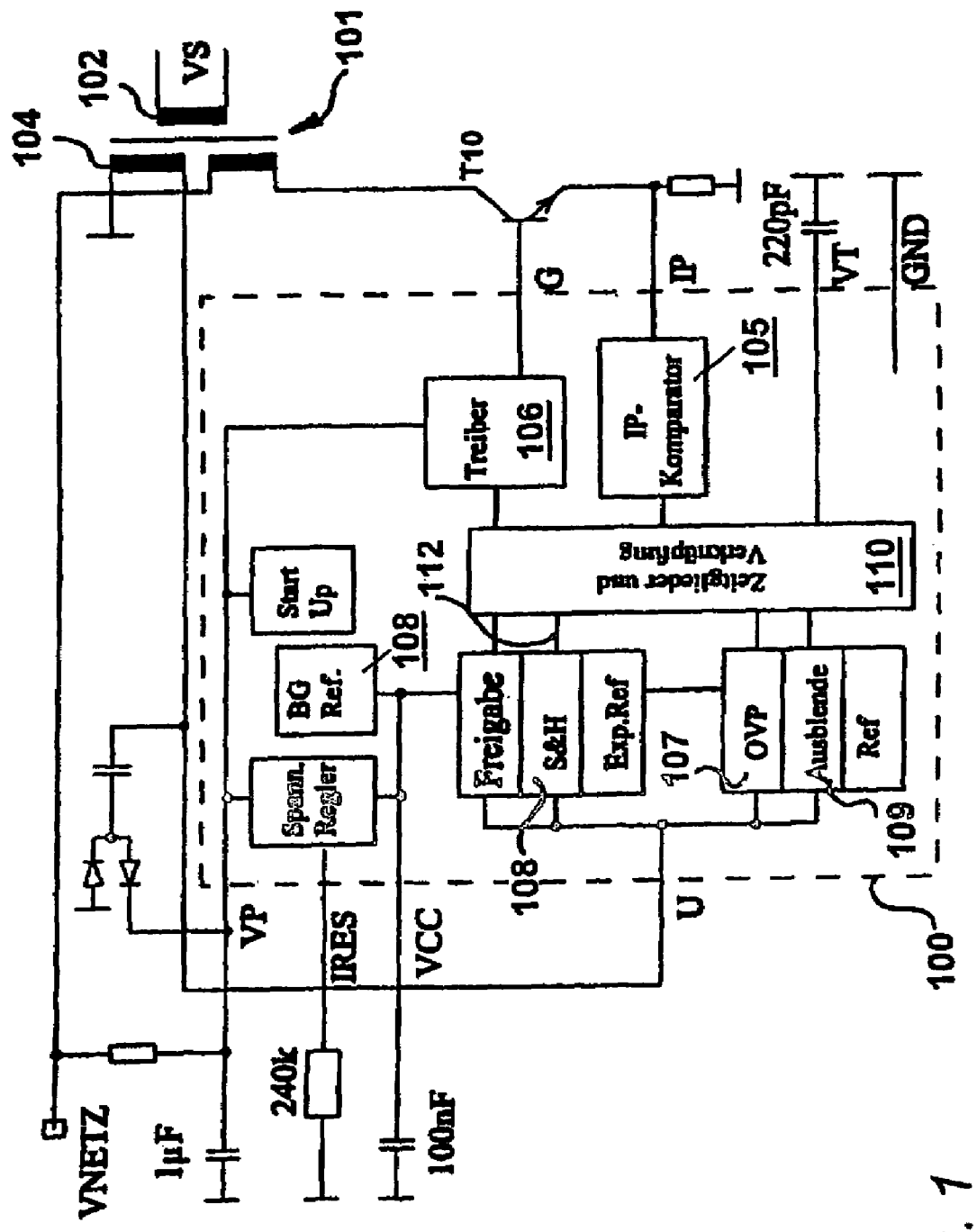
FIG. 1 shows a block diagram of a control circuit according to the present invention.

Referring now to the drawings and in particular to FIG. 1, a control circuit for controlling the output power of a primary-controlled switch mode power supply unit is shown in its application environment. Such a controller 100 may for instance be implemented as an application specific integrated circuit (ASIC). By means of the control circuit 100 the secondary power of the switched mode power supply unit which is output at the secondary winding 102 is controlled on the primary-side by controlling an electronic switch T10, here a power bipolar transistor. As controlled variable here the voltage across an auxiliary winding 104 is used. As can be seen schematically from curve 401 of FIG. 4, a positive voltage pulse is induced within the auxiliary winding after the switch T10 has opened, which exhibits at first an overshoot and then a continuously decaying course. After the duration of the voltage pulse 408 has expired, the voltage at the auxiliary winding decays with a transient oscillation to zero. A voltage pulse in negative direction is induced within the auxiliary winding, when the switch is closed again.

In particular the positive voltage pulse at the auxiliary winding after the opening of the switch may be used for controlling the output power of the switched mode power supply unit. Here the control is performed by means of a corresponding adapting of the time duration wherein the switch T10 is opened. The actual controlling of the bipolar transistor T10 is performed via a driver 106. From a band gap reference 108 the reference values for the controlling and the supply voltage are derived. Further circuit elements for switching on and off the driver 106 are the current and voltage detection with timing circuits and characteristics that describe the control characteristics. Protection functions for over-voltage and over-current are contained as well as a voltage controller and a start-up circuit. The sample and hold circuit 108 according to the present invention is supplied with a corresponding sample signal 112 from a circuit arrangement contained in the block "timing circuit and interconnection" 110, when the voltage value at the auxiliary winding has to be sampled and stored.

Figure 4:
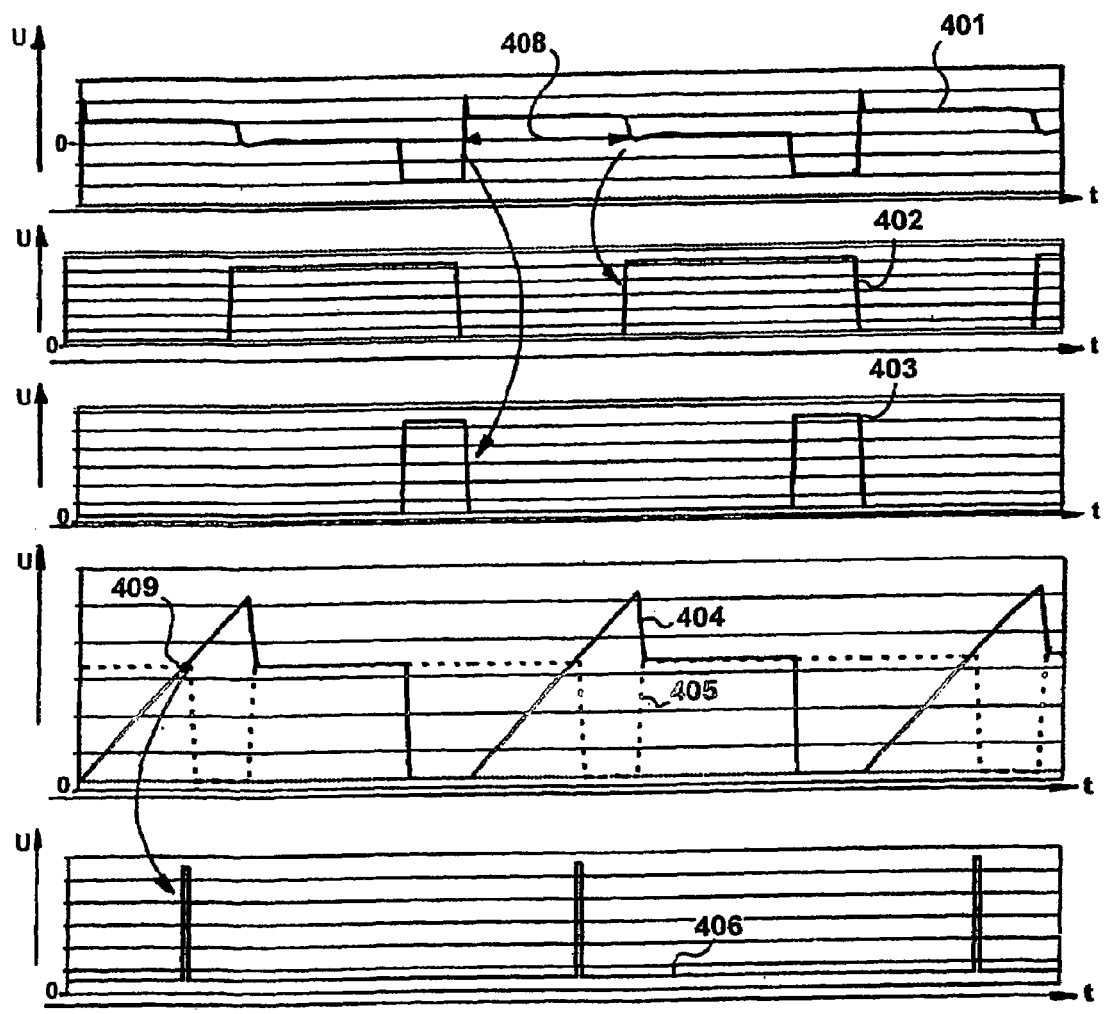
FIG. 4 shows qualitative timing diagrams of different signals and voltages within the control circuit according to the present invention.

According to the present invention, the control circuit 100 further comprises an over-voltage protection comparator 107 and a gating comparator 109, which are both supplied with the voltage that is induced at the auxiliary winding 104. The OVP comparator 107 detects positive voltages above the control region, switches off the driver 106 for the duration of a gating time and thus prevents the occurring of over-voltages. When the auxiliary winding works properly, a negative voltage pulse is induced when the primary-side switch is closed as shown in FIG. 4 in curve 401. If the auxiliary winding 104 is not connected or broken, this negative voltage pulse is missing. The gating comparator 109 detects the negative voltages during the closing of the primary-side switch and also triggers the blind-out time for the driver when a negative voltage pulse is missing. Thus, the primary-side switch remains open for such a long time, that the secondary basic load causes a decay of the output voltage before the next switching on of the switch to such a low value, that the following switching process can not raise the voltage over a secure level anymore. A possible fault at the connection between the control circuit 100 and the auxiliary winding 104 is thus safeguarded.

Furthermore, the control circuit 100 comprises an IP comparator 105, which measures the current IP flowing through the primary-side winding of the transformer 105, when the primary-side switch T10 is closed. In order to optimize the process of switching off the primary-side switch T10, the current IP within the IP comparator 105 is compared with two threshold values. When the current reaches the first threshold value, the driver 106 is switched to a high impedance. When reaching the second threshold value, the primary-side switch T10 is switched off actively. By means of the difference between the two threshold values the duration of the high impedance may be determined.

When the primary-side switch is for instance a field effect transistor, this difference is uncritical, because the gate capacity stores the charge for a relatively long time. In case that the primary-side switch T10 is a bipolar transistor, the first threshold value must be relatively near to the second threshold value, because after a short time the bipolar transistor starts to block. This effect, however, may be very advantageous, if the threshold values are optimized. For after a short time with high resistant basis, the primary-side switch is no longer saturated and may be turned off significantly quicker. This reduces the switching losses.

In practical use it has proved to be advantageous, when the first threshold value amounts to about 80% of second threshold value. During switching on, a delay time is relatively uncritical. The driver 106 is first switched high resistant and after a short delay time, for instance 100 nanoseconds, the primary-side switch is actively closed. When using a control method according to EP 1 146 630 A2, the method compensates automatically the resulting enlargement of the pause time and the output characteristics of the device stays unchanged.

Figure 2:
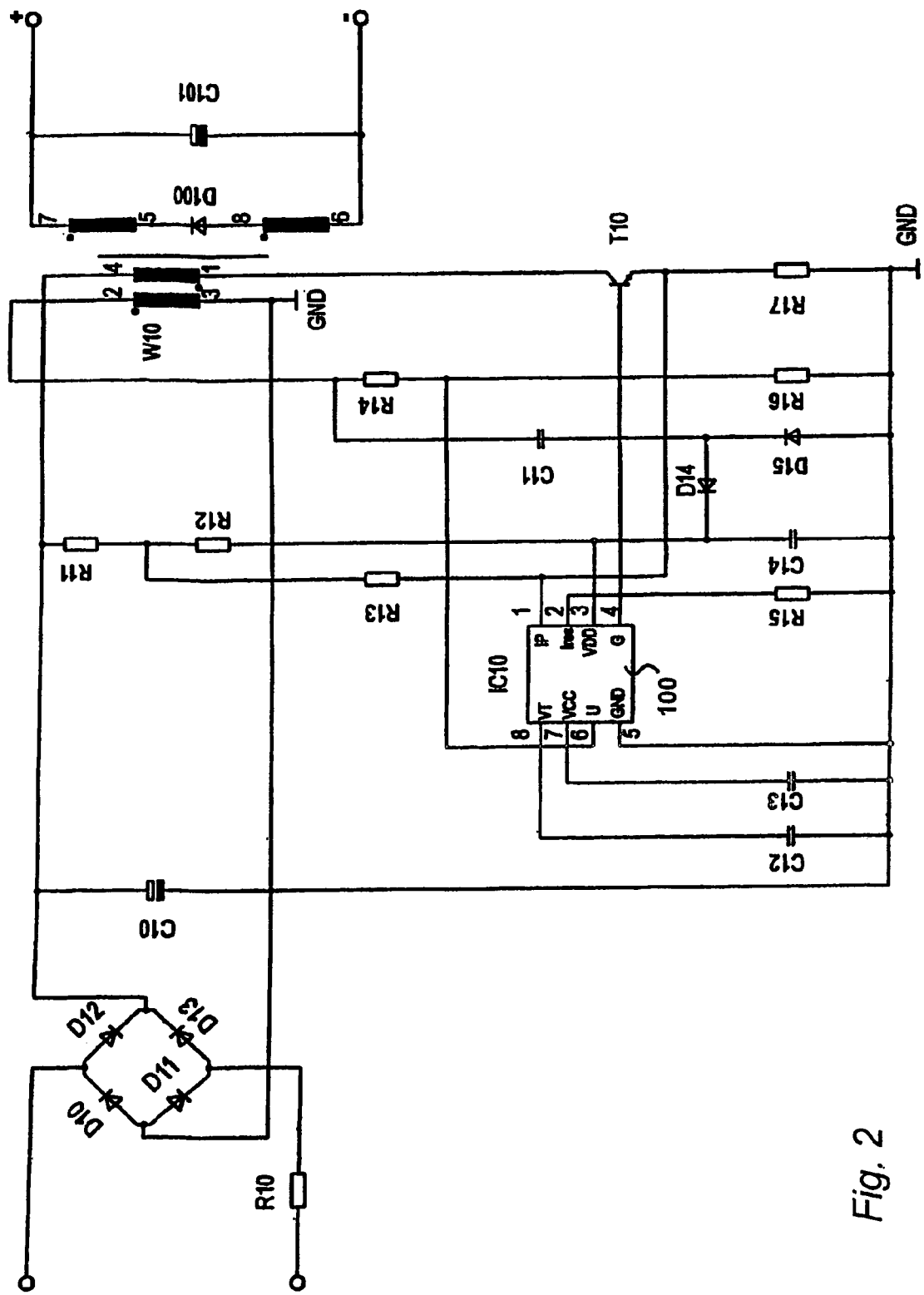
FIG. 2 shows a diagram of a primary-controlled switched mode power supply unit with a control circuit according to FIG. 1.

FIG. 2 shows in the form of a circuit diagram one embodiment of a switched mode power supply unit wherein the control circuit 100 according to the present invention is used.

Figure 3:
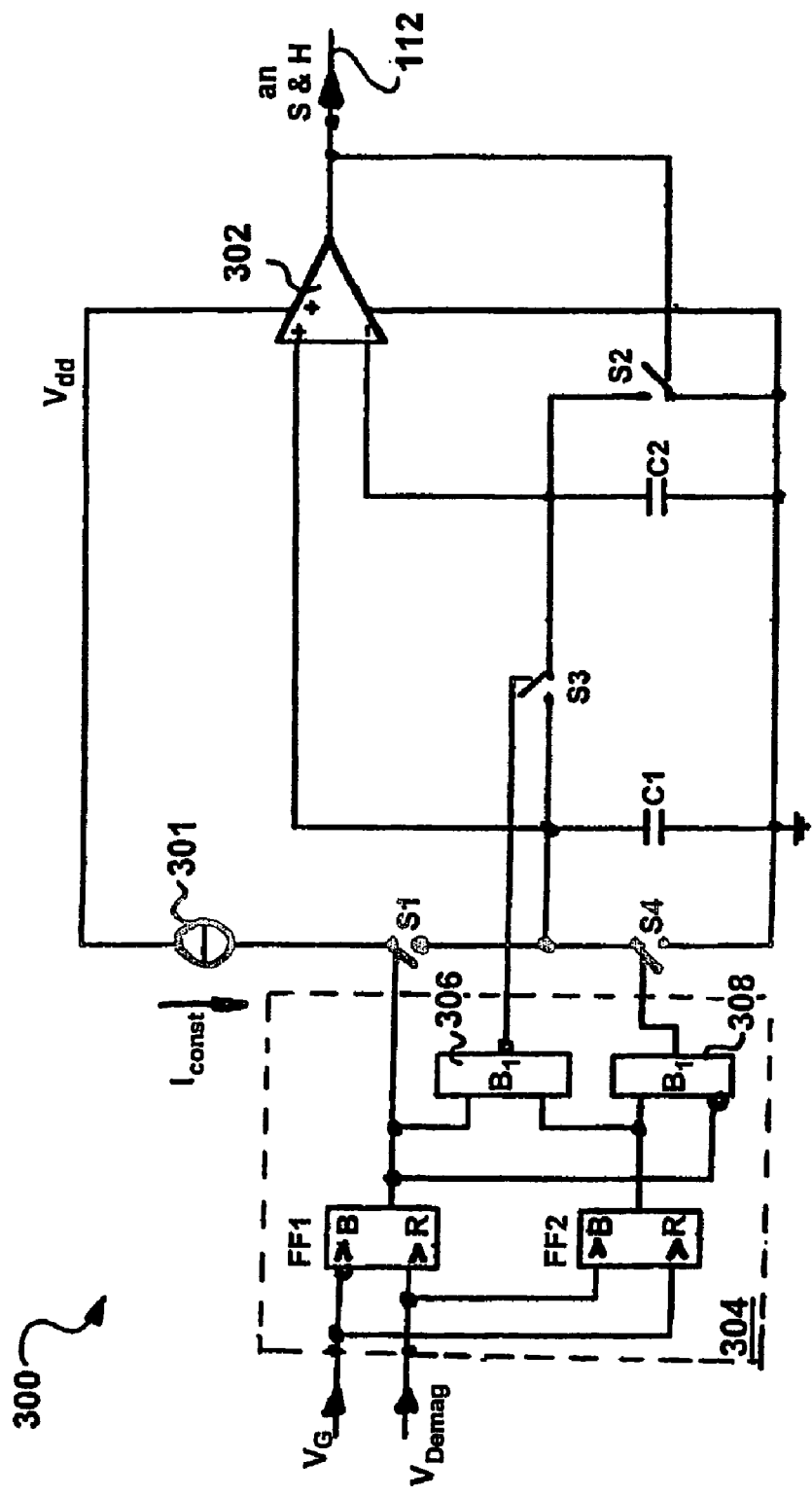
FIG. 3 shows a diagram of a circuit arrangement for generating a sample signal.

A possible circuit implementation of an arrangement for generating a sample signal, as it is contained within the block 110 of FIG. 1, is shown in FIG. 3. The circuit arrangement 300 outputs as an output signal the sampling signal 112 to the sample and hold circuit 108 of FIG. 1. At its input, the circuit 300 is provided with a control signal VG and the demagnetization signal VDemag. Here a control signal of the bipolar transistor VG serves for the detection of the beginning of the voltage pulse and the demagnetization signal VDemag serves for the detection of the end of the voltage pulse. The circuit arrangement 300 mainly comprises a first capacitor C1 and a second capacitor C2 as well as a constant voltage source 301 and a comparator 302. Four switches S1 to S4 coordinate charging and discharging of the two capacitors and a digital controller 304 controls these switches.

The control circuit 304 which is shown in FIG. 3 is formed by a first and a second RS-flip-flop and by a NOR-Gate and an AND-Gate.

In the following the operation of the circuit 300 will be described in detail. Immediately after the switching off of the primary-side switch T10 the first capacitor C1 is connected via the switch S1 with the constant current source 301 and is charged subsequently. The voltage at the first capacitor C1 is compared by means of the comparator 302 to the voltage of the second capacitor C2. When the voltage at the capacitor C1 reaches the value of the voltage at the second capacitor C2, the comparator 302 outputs the sampling signal 112 to the sample and hold unit 108. Simultaneously, the capacitor C2 is short circuited via the switch S2 and discharged via the switch S2. The capacitor C1 is further charged by means of the constant current source 301, until the demagnetization recognition with signalizes the end of the voltage pulse in the auxiliary winding a positive voltage edge of the signal VDemag. At this moment, the voltage U1 is lying at the capacitor C1. Now the charging of the capacitor C1 is brought to an end and the two capacitors C1 and C2 are connected in parallel by closing the switch C3, so that the capacitors C2 and the voltage U2=U1!C1/(C1+C2) is now lying at both capacitors. U2 may for instance equal to $\tfrac{2}{3} \cdot U1$, when the capacity values are chosen in a way that C1 is 2·C2. In this status the circuit 300 stays until the primary-side switch is closed and the switches S3 and S4 are actuated in a manner that the two capacitors are separated again and that the first capacitor C1 is discharged. With the switching off of the primary-side switch T10 the next switching cycle starts.

Because at the capacitor C2 at this moment $\tfrac{2}{3}$ of the maximum voltage which had been lying during the previous cycle at the first capacitor C1 are lying, for the sampling instance a value results which coincides with $\tfrac{2}{3}$ of the duration of the previous voltage pulse at the auxiliary winding. Generally, the sampling instance may be adjusted by means of the ratio C1/(C1+C2).

An overview of the time behaviors of the most important voltages (in a qualitative representation) is given in FIG. 4. Here the curve 401 signifies the course of the voltage at the auxiliary winding, the curve 402 the course of the demagnetization detection, the curve 403 the course of the control signal for the primary-side switch T10, the curve 404 the voltage at the first capacitor C1, the curve 405 the voltage at the second capacitor C2 and the curve 406 the sampling signal 112.

As can be seen from a comparison of curves 401 and 402, the rising edge of the demagnetization signal mirrors the decay of the voltage at the auxiliary winding to the value zero. Thus, the rising edge of curve 402 defines the end of duration of the voltage pulse 408. The beginning of the duration of the voltage pulse is signalized by the folding edge of the control voltage VG, which is shown in curve 403. The curves 404 and 405 show the voltage courses, which are lying over the first capacitor C1 and the second capacitor C2, respectively. Here the instance 409, when the both voltage values are equal determines the sampling instance, when the sampling signal 112 as shown in curve 406 is output to the sample and hold circuit. With the capacitor ratios of the capacitors C1 and C2 as chosen here, the sampling signal is chosen at a sampling instance which represents about ⅔ of the duration of the voltage pulse 408, as can be seen from a comparison of curves 401 and 406. This ratio has the advantage that the measurement is performed with a comparatively low current, namely at ⅓ of the maximum current. Furthermore, the sampling instance is always kept constant, as long as the duration of the voltage pulse is not changed. Thus, it may be guaranteed that a high controller accuracy is achieved.

The present invention is based on the idea, that the voltage pulse at the auxiliary winding in itself contains the necessary information on when a sampling and storing of the control variable yields the best control result under the prevailing operational conditions. When determining the sampling instance based on the duration of said voltage pulse, changes in the operational conditions, such as changes in the input mains voltage, can be taken into account in a simple and effective way. That is, the sampling instance is automatically adapted to the prevailing operational conditions. By means of this choosing of an advantageous sampling instance it may also be guaranteed that the measurement is done at a low current, whereby control deviations which are resulting from changes of the transformer inner resistance, the equivalent series resistance of the secondary capacitors, and the flow voltage of the secondary diode for instance due to temperature changes, may be reduced.

According to an advantageous embodiments for assessing the duration of the voltage pulse at the auxiliary winding, two input signals are used, which are necessary for controlling the switched mode power supply unit also in other respects: the control signal for closing the primary-sided switch, which mirrors the start of the voltage pulse after the primary-sided switch is opened, and the demagnetization signal, which shows whether the transformer is without energy and therefore contains information about the end of the voltage pulse at the auxiliary winding. By using these input signals, additional detection devices can be dispensed with and therefore the complexity of the control circuit may be retained at the lowest possible level.

According to an advantageous embodiment of the present invention, the circuit arrangement for generating the sample signal which defines the sample instance with respect to the moment of the opening of the primary-sided switch, comprises a constant current source, a first capacitor which may be charged by this constant current source, a second capacitor which may be connected in parallel to the first capacitor, and a comparator. The comparator is connected to one terminal of each of the capacitors and is operable to output the sample signal, when the voltages across both capacitors are equal. With such a control circuit, the sample signal for one switching cycle can be defined automatically within the respective preceding switching cycle. Here the second capacitor comprises in the form of its charge the information about the duration of the voltage pulse during the respective previous switching cycle. The first capacitor, which is charged by means of the constant current source, on the other hand contains the information about the duration of the voltage pulse during the respective actual switching cycle.

A time coordination of the charging and discharging of these two capacitors can be performed in the easiest way by means of a plurality of correspondently arranged controllable switches.

According to an advantageous embodiment, a first switch is arranged between the constant current source and the first capacitor, in order to disconnect same from the constant current source, when the end of the voltage pulse has been detected, and thereby terminate the charging of the first capacitor. A second switch is connected in parallel to the second capacitor and may be controlled by the sample signal in a way that the second capacitor is discharged due to the sending of the sample signal. A third switch is arranged in a way that the first and second capacitor are arranged in parallel to each other, while the third switch is closed and is controlled in way that it is closed in the same moment when the end of the voltage pulse is signalized. Thus, in a particularly simple way a transfer on the charge from the first capacitor to the second capacitor can be achieved. Finally, a fourth switch is lying parallel to the first capacitor and allows a discharging of the first capacitor, when the fourth switch is closed.

In an advantageous way for determining the duration of the voltage pulse those signals are used which are also needed for the remaining functions of the control circuit, that is a control signal for the primary-side switch, which is lying on high potential when the switch is closed and is lying at low potential, when the switch is opened, and a demagnetization signal which is on high potential when the voltage at the auxiliary winding is below a particular threshold value, and on low potential, when the voltage at the auxiliary winding is above a particular threshold value.

In order to provide the necessary time coordination by means of the above described switches in a particularly simple way, the circuit arrangement comprises advantageously a control device which has at least one output for controlling the plurality of switches dependent on the duration of the voltage pulse.

Such a control device may be implemented in a particularly simple manner by means of digital logic components.

The advantageous characteristics of the control circuit according to the present invention show their best advantages when using the control circuit in a primary-controlled switched mode power supply unit which has an electronic switch as primary-side switch, preferably a power bipolar transistor. Alternatively, also power MOSFETs or IGBTs may be used.

In a switched mode power supply unit with an output voltage control that samples the voltage at a primary auxiliary winding, an over-voltage protection circuit may be provided as a second control loop or an over-voltage interruption at the same auxiliary winding. According to the present invention, the voltage at the auxiliary winding may be used for detecting a wire breakage. If for instance no negative voltage results at the measurement point when switching on the primary switch, the auxiliary winding is not connected or broken. In this case, a respective control circuit may switch the device into a secure mode and thus can guarantee the compliance with the requirements with respect to the security low voltage. For instance, the primary-sided switch is switched off for such a long time that due to the secondary basic load the output voltage before the next switching on of the switch decreases to such a low value, that the next switching process may not enlarge the voltage above the secure value. Therefore, in an advantageous manner the complete output voltage controlling, including the over-voltage protection, may be integrated into one integrated circuit and no further electronic components are necessary.

Such a wire breakage detection in many fault cases prevents subsequent faults which otherwise occur quite often due to faulty connections or a not connected auxiliary winding. Thus, in these cases a repair is significantly simplified. The over-voltage protection can become active even in case of a very small transgression over the normal voltage level, so that in case of a fault, the connected devices and users who touch the output connector are not endangered. Within the integrated circuit for instance two identical voltage controls may be provided, so that only the internal tolerance determines which branch performs the normal controlling and which branch performs the over-voltage monitoring. In this case, the over-voltage level is almost identical with the normal voltage level.

In order to optimize the process of the switching of the primary-side switch and to achieve thereby a saving of energy, the current within the transformer is compared to two threshold values according to the present invention. If the current reaches the first threshold value, the driver is switched to a high ohmic value. When reaching the second threshold value, the primary-sided switch is switched off actively. Such a driver exhibits in an advantageous way a low current demand. In case of a bipolar transistor as the primary-sided switch, the switching losses may be reduced. Furthermore, the dependence of the primary current on the input voltage may be reduced by means of the driver circuit according to the present invention. Finally, an automatic adjusting of the switching instances to different rising velocities of the primary current is necessary. Such a driving circuit in particular for low power switched mode power supply units that may not have more than for instance 0.3 W power dissipation at low load has significant advantages.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. Control circuit for controlling the output power of a primary-control switched mode power supply unit, said switched mode power supply unit comprising a primary-side switch and a transformer with an auxiliary winding, wherein after the opening of the primary-side switch a voltage pulse is induced,
   wherein said control circuit comprises a circuit arrangement for generating a sampling signal which defines a sampling instance with respect to the instance of the opening of the primary-side switch,
   a sample and hold device for sampling and storing a height of the voltage pulse in response to the sampling signal for generating a controlled variable, and
   a control unit for comparing the controlled variable with a reference value and for adjusting the output power dependent on the result of this comparison,
   wherein said circuit arrangement is adapted to determine the sampling instance based on the duration of said voltage pulse.

2. Control circuit according to claim 1, wherein said circuit arrangement is interconnected in a way, that it receives a control signal for closing the primary-side switch and a demagnetization signal indicating whether the transformer is without energy, in order to determine therefrom the duration of the voltage pulse.

3. Control circuit according to claim 2, wherein the control signal for the primary-side switch is on high potential, when the switch is closed, and on low potential, when the switch is opened, and that the demagnetization signal is on high potential, when the voltage at the auxiliary winding is below a predetermined threshold value, and is on low potential, when the voltage at the auxiliary winding is above a predetermined threshold value.

4. Control circuit according to claim 1, wherein the circuit arrangement comprises the following elements:
   a constant current source,
   a first capacitor to be charged by means of the constant current source,
   a second capacitor to be connected in parallel to the first capacitor,
   a comparator which is connected to one terminal of each of the two capacitors and is operable to output the sampling signal, if the voltages at the two capacitors are equal.

5. Control circuit according to claim 4, wherein the circuit arrangement comprises a plurality of switches in order to coordinate the timing of the charging and discharging of the first and the second capacitor.

6. Control circuit according to claim 5, wherein between the constant current source and the first capacitor a first switch is arranged,
   that a second switch for short-circuiting the second capacitor is arranged in parallel to the second capacitor, and that the second switch is controllable by the sampling signal,
   that the first and the second capacitor are connected with one terminal each to a common ground potential and that between the respective other terminals a third switch is arranged, and
   that a fourth switch for short-circuiting by the first capacitor is arranged in parallel to the first capacitor.

7. Control circuit according to claim 5, wherein the circuit arrangement further comprises a control device, which comprises at least one output for controlling the plurality of switches dependent on the duration of the voltage pulse.

8. Control circuit according to claim 7, wherein the control device comprises a first and a second RS flip-flop,
   wherein the first RS flip-flop is connected with its setting input to the negated switching-on signal and with its reset input to the demagnetization signal, and wherein the second RS flip-flop is connected with its setting input to the demagnetization signal and to its reset input with the switching on signal,
   wherein the output of the first RS flip-flop controls the first switch, and is further connected with a NOR-Gate for controlling the third switch and is connected with a negated input of an AND-gate which controls with its output the fourth switch, wherein an output of the second RS flip-flop is connected with a second input of the NOR-Gate and further with the second input of the AND-gate.

9. Primary-controlled switched mode power supply unit with a control circuit according to claim 1 wherein the primary-side switch is an electronic switch, preferably a power bipolar transistor.

10. Circuit arrangement for generating a sampling signal that determines the instance of sampling a controlled variable for controlling the output power of a primary-controlled switched mode power supply unit, wherein said switched mode power supply unit comprises a primary-side switch and a transformer with an auxiliary winding, wherein after the opening of the primary-side switch a voltage pulse is induced and wherein the circuit arrangement comprises the following elements:

a constant current source, a first capacitor to be charged by means of the constant current source, a second capacitor to be connected in parallel to the first capacitor, a comparator which is connected to one terminal of each of the two capacitors and is operable to output the sampling signal, if the voltages at the two capacitors are equal.

11. Circuit arrangement according to claim 10, wherein the circuit arrangement comprises a plurality of switches in order to coordinate the timing of the charging and discharging of the first and the second capacitor.

12. Circuit arrangement according to claim 11, wherein between the constant current source and the first capacitor a first switch is arranged, that a second switch for short-circuiting the second capacitor is arranged in parallel to the second capacitor, and that the second switch is controllable by the sampling signal, that the first and the second capacitor are connected with one terminal each to a common ground potential and that between the respective other terminals a third switch is arranged, and that a fourth switch for short-circuiting the first capacitor is arranged in parallel to the first capacitor.

13. Circuit arrangement according to claim 11, further comprising a control device which comprises at least one output for controlling the plurality of switches in response to at least one input signal that contains information about the duration of the voltage pulse.

14. Circuit arrangement according to claim 13, wherein the input signal is formed by a control signal for the primary-side switch and a demagnetization signal, which is at high potential, when the voltage at the auxiliary winding is below a predetermined threshold value, and is at low potential, when the voltage at the auxiliary winding is above a predetermined threshold value.

15. Circuit arrangement according to claim 14, wherein the control device comprises a first and a second RS flip-flop, wherein the first RS flip-flop is connected with its setting input to the negated switching on signal and with its reset input to the demagnetization signal, and wherein the second RS flip-flop is connected with its setting input to the demagnetization signal and with its reset input to the switching on signal, wherein the output of the first RS flip-flop controls the first switch, and is further connected with a NOR-Gate for controlling the third switch and is connected with a negated input of an AND-gate which controls with its output the fourth switch, wherein an output of the second RS flip-flop is connected with a second input of the NOR-Gate and further with the second input of the AND-gate.

16. Method for controlling the power of a primary-controlled switched mode power supply unit with a transformer and a primary-side switch, wherein the transformer comprises an auxiliary winding wherein after the opening of the primary-side switch a voltage pulse is induced, and wherein the method comprises the following steps:

during one switching cycle, sampling and storing a height of the voltage pulse in response to a sampling signal which defines a sampling instance after the opening of the switch for generating a controlled variable, comparing the controlled variable with a reference value and adjusting the output power dependent on the result of said comparison, wherein the sampling instance is determined based on the duration of the voltage pulse at the auxiliary winding during a previous switching cycle.

17. Method according to claim 16, wherein a further sampling signal is generated for a following switching cycle.

18. Method according to claim 16, wherein the sampling instance is determined with respect to the instance when the primary switch opens at a fixed fraction, preferably two thirds, of the duration of the voltage pulse.

19. Method according to claim 16, wherein the step of generating the sampling signal comprises the following steps:

charging the first capacitor after the switch has opened, comparing the voltage at the first capacitor with a voltage at a second capacitor, which may be connected in parallel to the first capacitor, and outputting the sampling signal, if the comparison yields that the voltages at both capacitors are equal.

20. Method according to claim 19, wherein the second capacitor is discharged after outputting the sampling signal.

21. Method according to claim 19, wherein the first capacitor is charged from a constant current source, until the voltage pulse ends.

22. Method according to claim 19, wherein the first and the second capacitor are connected in parallel, when the voltage pulse ends, so that the second capacitor is charged by means of the first capacitor and that the same voltage is lying at both capacitors.

23. Method according to claim 19, wherein the capacitors are separated from each other and that the first capacitor is discharged, when the primary-side switch is closed.

24. Method according to claim 16, wherein the starting of the voltage pulse is defined by a falling of the control signal for the primary-side switch to low potential, and that the end of the voltage pulse is defined by a rising of the demagnetization signal, wherein the demagnetization signal is at high potential, when the voltage at the auxiliary winding is below predetermined threshold value and at low potential, when the voltage at the auxiliary winding is above a predetermined threshold value.

25. Method according to claim 16, wherein the step of adjusting the output power comprises adapting the time period during which the primary-side switch is opened.

26. Method according to claim 16, wherein the primary-side switch is a power bipolar transistor, a field effect transistor or an insulated gate bipolar transistor (IGBT).

27. Method according to claim 16, wherein the sampling and storing of the height of the voltage pulse is performed by means of a sample and hold element (S & H).

28. Method for controlling the output power of a primary-controlled switched mode power supply unit with a transformer and a primary-side switch, wherein the transformer comprises an auxiliary winding, wherein after the opening of the primary-side switch a first voltage pulse and after the closing of the primary-side switch a second voltage pulse is induced, and wherein the method comprises the following steps:
- during one switching cycle, sampling and storing a height of the first voltage pulse for generating a controlled variable,
- comparing the controlled variable with a reference value and adjusting the output power dependent on the result of said comparison,
- sampling a height of the second voltage pulse and comparing same with a threshold value and setting a secure operating modus of the switched mode power supply unit, in case that the comparison indicates a transgression of said threshold value.

29. Method according to claim 28, wherein the setting of a secure operational modus comprises switching off a driver, which controls the primary-side switch.

30. Primary-controlled switched mode power supply unit with a transformer and a primary-side switch, wherein the transformer comprises an auxiliary winding, wherein after the opening of the primary-side switch a first voltage pulse is induced and after the closing of the primary-side switch a second voltage pulse is induced, wherein same is operable to perform the method according to claims 28.

* * * * *

UNITED STATES PATENT AND TRADEMARK OFFICE
CERTIFICATE OF CORRECTION

| | | |
|---|---|---|
| PATENT NO. | : 7,102,899 B2 | Page 1 of 1 |
| APPLICATION NO. | : 11/057029 | |
| DATED | : September 5, 2006 | |
| INVENTOR(S) | : Reinhard et al. | |

It is certified that error appears in the above-identified patent and that said Letters Patent is hereby corrected as shown below:

Title Page, please insert the following:

Item --(63) Related U.S. Application Data
Continuation of application No. PCT/EP04/02421 filed on Mar. 9, 2004

(30) Foreign Application Priority Data
Mar. 10, 2003 (DE) ........................... 10310361.9--

Signed and Sealed this

Fifth Day of May, 2009

JOHN DOLL
*Acting Director of the United States Patent and Trademark Office*